(12) United States Patent
Bellanger et al.

(10) Patent No.: US 9,914,191 B2
(45) Date of Patent: Mar. 13, 2018

(54) CHAMFERING OF LAMINATE LAYERS

(75) Inventors: Yohann Bellanger, Newport (GB); Christopher Thomson, Newport (GB)

(73) Assignee: Vestas Wind Systems A/S, Aarhus N. (DK)

( * ) Notice: Subject to any disclaimer, the term of this patent is extended or adjusted under 35 U.S.C. 154(b) by 630 days.

(21) Appl. No.: 13/641,636

(22) PCT Filed: Jul. 19, 2011

(86) PCT No.: PCT/DK2011/050287
§ 371 (c)(1),
(2), (4) Date: Mar. 29, 2013

(87) PCT Pub. No.: WO2012/013193
PCT Pub. Date: Feb. 2, 2012

(65) Prior Publication Data
US 2013/0185924 A1     Jul. 25, 2013

Related U.S. Application Data

(60) Provisional application No. 61/413,078, filed on Nov. 12, 2010.

(30) Foreign Application Priority Data

Jul. 30, 2010   (GB) .................................. 1012868.4

(51) Int. Cl.
*B23Q 11/10* (2006.01)
*B24B 9/20* (2006.01)
(Continued)

(52) U.S. Cl.
CPC .......... *B23Q 11/10* (2013.01); *B23Q 11/1053* (2013.01); *B24B 9/20* (2013.01);
(Continued)

(58) Field of Classification Search
CPC ......... B23Q 11/10; F04D 29/38; B29C 70/54; B29C 70/545; B29C 2035/165;
(Continued)

(56) References Cited

U.S. PATENT DOCUMENTS 5,294,394 A * 3/1994 Sakai ...................... B29C 51/02
156/242
6,820,334 B2 * 11/2004 Kebbede ................. B23P 6/005
29/889.1
9,096,045 B2 * 8/2015 Dodge, III ........... D06N 7/0084

FOREIGN PATENT DOCUMENTS

DE          3939374 A1    6/1991
DE          4238412 A1    5/1994
(Continued)

OTHER PUBLICATIONS

International Bureau, International Preliminary Report on Patentability issued in corresponding PCT/DK2011/050287 dated Feb. 14, 2013, 7 pages.

(Continued)

*Primary Examiner* — Richard Chang
(74) *Attorney, Agent, or Firm* — Wood Herron & Evans LLP

(57) ABSTRACT

A method of machining a fibrous sheet for a composite structure is described. The sheet comprises a resin matrix having a glass transition temperature, wherein the method comprises cooling the sheet substantially to maintain the temperature of the matrix below its glass transition temperature during machining.

25 Claims, 4 Drawing Sheets

(51) Int. Cl.
  *B24B 41/06*   (2012.01)
  *B24B 55/02*   (2006.01)
  *B29C 70/54*   (2006.01)
  *F04D 29/38*   (2006.01)
  *B29C 35/16*   (2006.01)

(52) U.S. Cl.
  CPC ............ *B24B 41/068* (2013.01); *B24B 55/02* (2013.01); *B29C 70/54* (2013.01); *B29C 70/545* (2013.01); *F04D 29/38* (2013.01); *B29C 2035/165* (2013.01); *Y10T 29/49995* (2015.01); *Y10T 29/54* (2015.01)

(58) Field of Classification Search
  CPC ......... B24B 41/068; B24B 9/20; B24B 55/02; Y10T 29/49995; Y10T 29/54
  See application file for complete search history.

(56) References Cited

FOREIGN PATENT DOCUMENTS

| | | |
|---|---|---|
| DE | 19818379 C1 | 10/1999 |
| DE | 102007003596 A1 | 7/2008 |
| EP | 1786617 A1 | 5/2007 |
| JP | 7124944 A | 5/1995 |

OTHER PUBLICATIONS

International Searching Authority, International Search Report and Written Opinion issued in International Application No. PCT/DK2011/050287 dated Jan. 18, 2012, 12 pages.

\* cited by examiner

CHAMFERING OF LAMINATE LAYERS

This invention relates to techniques for chamfering layers or plies used in composite structures, such as wind turbine blades.

Composite structures typically comprise one or more plies, each ply being a fibre-reinforced sheet that may comprise a thermoplastic or thermosetting resin matrix. The fibres may be pre-impregnated with the matrix as a 'prepreg' or the matrix may be impregnated into a fibre sheet during fabrication of a composite structure, for example during lay-up or injection-moulding procedures. Alternatively, the fibre-reinforced sheet may be pre-impregnated on just one side by a resin foil, i.e. a 'semi-preg'.

Plies are commonly laid atop one another in a layered or laminated arrangement. Single-ply composite structures are also possible, with single-thickness plies abutting in edge-to-edge relationship or overlapping at their edges. The plies are commonly supported by a foam core to define a skin on or around the core.

In some circumstances, it is desirable to chamfer an edge of a ply. For example, plies may abut edge-to-edge in a composite structure and it is desirable to maximise the surface area of the interface between the abutting plies. This is because the shear strength at the interface is a small fraction—possibly as little as 5%—of the tensile strength of the plies themselves. The alternative of overlapping abutting plies leads to stress concentration and disadvantageously kinks the load path extending from one ply to another. Also, where plies define the external surface of a composite structure, an overlap between the plies makes a smooth finish difficult to achieve.

It is also well known to taper a composite structure by reducing the number of plies from one location to another across the structure. Such tapering is common in aerofoil members such as wind turbine blades, which taper in both the spanwise direction from blade root to blade tip and in the chordwise direction from leading edge to trailing edge. To achieve this, some plies may be terminated or 'dropped' inward of an extremity of the structure, leaving other continuous plies to extend further toward that extremity.

Plies are preferably dropped in a staggered or interleaved manner to make the transition as gradual as possible. However, each dropped ply introduces a region of weakness in view of discontinuity between the neighbouring plies, with the possibility of resin concentrations or gas pockets in any gaps between plies, especially at the edge of dropped plies. Here, edge chamfering is helpful to minimise gaps, to straighten the load path and to maximise the surface area of the interface between plies. This allows thicker plies to be used, which facilitates the lay-up process because fewer layers are then required in the laminate to achieve a required overall thickness.

Plies for use in composite structures are difficult to chamfer efficiently, accurately and repeatably, particularly with the shallow taper angle that is desirable to maximise the surface area of the edge interface. The plies are flexible and compressible and so tend to move unpredictably under the forces applied by the chamfering process. Also, the plies may degrade with heat generated by the chamfering process. This is a particular problem with prepregs, if the matrix cures or otherwise transforms with heat. For example, heat generated during chamfering may cause the thermoplastic matrix to soften or melt and clog the chamfering tool. If the matrix softens or melts, it is also possible for the chamfering tool to drag the ply unpredictably, possibly distorting it and so undermining the accuracy of cutting.

Some examples of ply-tapering tools are disclosed in EP 1786617. These include finger cutters akin to hair trimmers, but finger cutters are not suitable for cutting prepregs in which the fibres are embedded in a matrix because the matrix prevents the fingers from penetrating between the fibres. EP 1786617 also discloses milling cutters with inclined faces, turning about an axis orthogonal to a plane containing the edge being tapered. When configured as shown in EP 1786617, milling cutters impart heat to the ply that may degrade the ply and melt its matrix if the ply is a thermoplastic prepreg; this is also a problem suffered by abrading techniques proposed elsewhere in the art, using a belt sander or the like. Also, when configured as shown in EP 1786617, milling cutters impart a side force to the ply, parallel to the tapered edge, that tends to distort the ply and so undermines the accuracy of cutting. This is also a problem suffered by knife-cutting techniques proposed elsewhere in the art.

It is against this background that the present invention has been made.

SUMMARY OF THE INVENTION

In accordance with the present invention, there is provided a method of machining a fibrous sheet for a composite structure, the sheet comprising a resin matrix having a glass transition temperature, wherein the method comprises: providing a fibrous sheet at a first temperature; supporting the sheet for machining; and cooling at least part of the sheet to a second temperature below the first temperature, substantially to maintain the temperature of the matrix below its glass transition temperature during machining.

The resin becomes hard and brittle when cooled, which makes it easier to machine. Generally, the resin becomes harder and more brittle with decreasing temperature. Therefore, it is preferable to cool the material to the lowest temperature possible within realistic practical and economic constraints.

The glass transition temperature of the uncured resin may also be referred to in the art as the 'cold $T_g$' or the 'uncured $T_g$', and is an intrinsic property of the resin that will vary from material to material. Put simply, the cold/uncured $T_g$ is the glass transition temperature of a matrix that has reacted at ambient temperature, and hence exhibits a relatively low degree of cross-linking. Material suppliers such as Gurit™ can provide details of the cold/uncured $T_g$ of the materials that they supply. However, as a matrix ages, some additional cross linking will occur, causing the cold $T_g$ to increase slightly with time. The $T_g$ of the uncured resin in typical prepreg or semi-preg materials used in the construction of modern wind turbine blades is generally below 0° C., for example around −2° C. In comparison, when a matrix is cured at an elevated temperature, it will exhibit a relatively high degree of cross-linking, resulting in the cured matrix having a much higher $T_g$, typically well in excess of 100° C.

The inventive concept encompasses a method of making a composite structure, comprising: tapering an edge of a fibrous reinforcement in accordance with the above machining method; and incorporating the sheet into a composite structure with the tapered edge lying against or beside at least one other fibrous reinforcement sheet.

The present invention also provides an apparatus for machining a fibrous sheet for a composite structure, the apparatus comprising: a support for the sheet; a machining tool movable relative to the support; and a cooling system for cooling the sheet.

The inventive concept also encompasses a composite structure such as a wind turbine blade produced by the above methods or apparatus.

Optional features of the present invention are set out in the sub claims appended hereto.

BRIEF DESCRIPTION OF THE DRAWINGS

In order that the invention may be more readily understood, reference will now be made, by way of example, to the accompanying drawings in which.

DETAILED DESCRIPTION

Figure 1:
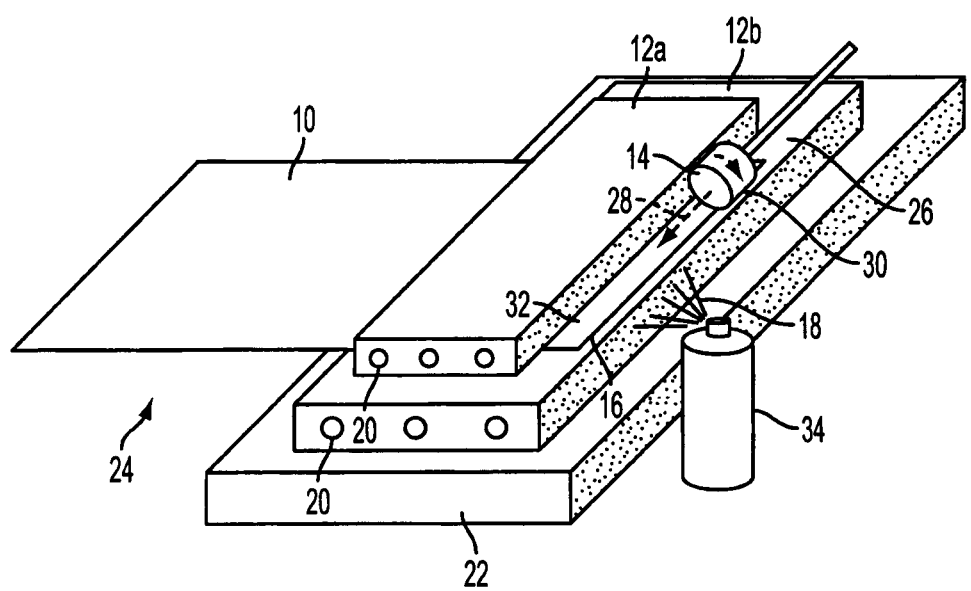
FIG. 1 is a schematic perspective view of an apparatus for machining a prepreg or semi-preg ply, in which refrigerant is applied to the ply prior to machining.

Referring to FIG. 1, a prepreg ply 10 is clamped between refrigerated steel blocks 12a, 12b, and a grinding wheel 14 is arranged to translate across a free edge 16 of the ply 10 to remove material from that edge to create a chamfer. Refrigerant 18 is applied locally to the free edge 16 of the ply 10 during the chamfering operation. The apparatus and chamfering technique are described in further detail below.

The prepreg ply 10 comprises a sheet of glass fibre fabric, which has been impregnated with a thermoset matrix, which in this example is pre-catalysed epoxy resin. The glass fibre fabric consists of two layers and is commonly referred to as 'triax'. The first layer includes a set of unidirectional (ud) fibres, whilst the second layer is a layer of 'biax', which has a first set of unidirectional fibres oriented at an angle of +45° relative to the fibres in the first layer, and a second set of unidirectional fibres oriented at an angle of −45° relative to the fibres in the first layer.

The steel blocks 12a,12b are oblongs and include internal refrigeration channels 20. A refrigerant is pumped through the channels 20 to cool the blocks 12a,12b to a temperature of −50° C., and then continuously pumped through the channels 20 to maintain the temperature of the blocks 12a,12b at −50° C. Alternatively, the blocks 12a,12b may be placed in a refrigerator at −50° C. for several hours prior to the chamfering operation. In this way, the refrigeration channels 20 may not be required.

The steel blocks 12a,12b are placed one on top of the other, with the lower steel block 12b being located on an insulating foam block 22 to reduce heat transfer from a work surface 24 to the cold blocks 12a,12b. An end portion of the prepreg ply 10 is sandwiched between the steel blocks 12a,12b and the blocks are clamped together by a clamp (not shown) to hold the ply 10 firmly in place. The upper block 12a is set back from the lower block 12b by approximately 40 mm to define an elongate ledge 26. The free edge 16 of the ply 10 extends from between the steel blocks 12a,12b onto this ledge 26.

The grinding wheel 14 is arranged to traverse along the ledge 26 in a direction parallel to the exposed free edge 16 of the ply 10 as indicated by the arrow 28 in FIG. 1. The grinding wheel 14 has an abrasive cylindrical outer surface 30, which rotates about an axis parallel to the free edge 16 of the ply 10, i.e. parallel to its direction of translation 28 across the ply 10. In use, the grinding wheel 14 is angled slightly with respect to the surface 32 of the ply 10 and traversed across the free edge 16 to create a chamfer of a desired gradient. A shallow chamfer gradient in the range of 1:20 to 1:10 i.e. approximately 2.8° to 6° is particularly desirable.

Prior to chamfering commencing, the free edge 16 of the ply 10 is sprayed with tetrafluoroethane refrigerant (R134a) from a spray can 34. It will of course be appreciated that other suitable refrigerants may be used for this purpose, for example liquid nitrogen or liquid carbon dioxide. Spraying the free edge 16 of the ply 10 with refrigerant cools the ply 10 to well below the glass transition temperature ($T_g$) of the uncured epoxy resin in the prepreg. Typically the $T_g$ of the uncured epoxy is around −2° C. Maintaining the temperature of the resin below its uncured $T_g$ during chamfering ensures that the resin remains hard during the chamfering process. This prevents the resin from becoming tacky and contaminating or clogging the abrasive surface 30 of the grinding wheel 14, which would otherwise occur if chamfering was conducted at room temperature. The cold steel blocks 12a, 12b ensure that any heat generated during the chamfering operation is channeled away from the ply 10.

Figure 2:
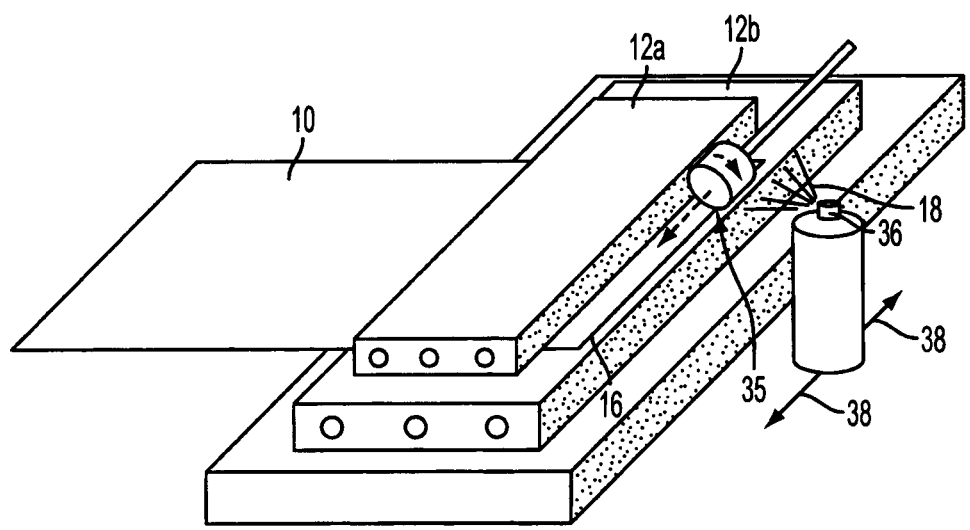
FIG. 2 is a schematic perspective view of the apparatus of FIG. 1, in which the refrigerant is applied to the machining site during the machining process.

Experimental tests have shown that a single application of the R134a refrigerant to the free edge 16 of the ply 10 prior to chamfering is sufficient to keep the temperature of the ply 10 below the $T_g$ of the uncured resin. However, if necessary, the refrigerant may be applied repeatedly or continuously during chamfering to keep the temperature of the ply 10 below the $T_g$ of the uncured resin. Applying the refrigerant continuously has the advantage that a flow of refrigerant will carry heat away from the worksite. In the example shown in FIG. 2, the refrigerant 18 is applied during machining and is applied locally at the machining site 35. A nozzle 36 supplying the refrigerant 18 may be arranged to move in tandem with the grinding wheel 14 as represented by the arrows 38 in FIG. 2. Applying the refrigerant 18 locally at the machining site 35 is advantageous because it concentrates the refrigerant 18 at the point where heat is generated.

Figure 3:
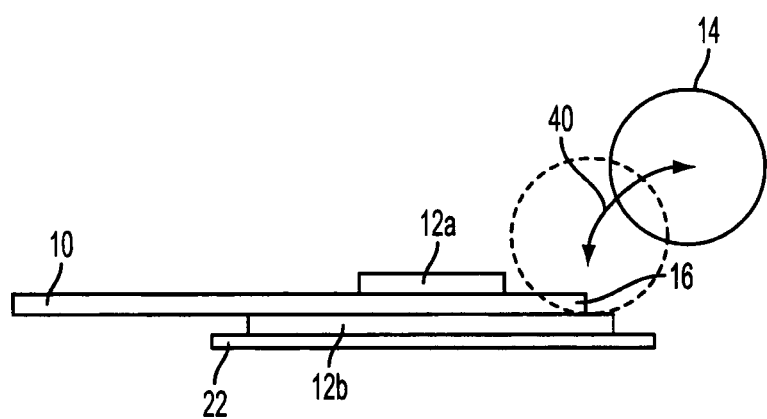
FIG. 3 is a schematic side view showing a machining tool being movable towards and away from an edge of a ply along an arc-shaped path.

In order to assist heat dissipation from the free edge 16 of the ply 10, rather than being translated across the ply 10 in a single motion, the grinding wheel 14 may be pressed against the free edge 16 of the ply 10 in a series of pressing operations across the width of the ply 10. This is represented schematically in FIG. 3, which shows the grinding wheel 14 being movable towards and away from the free edge 16 of the ply 10, i.e. in and out of contact with the free edge 16, along an arc-shaped path 40. Refrigerant is continuously applied to the free edge 16 so that cooling continues between presses, i.e. whilst the grinding wheel 14 is moved out of contact with the free edge 16 of the ply 10.

Whilst not shown in the above figures, the humidity of the air surrounding the apparatus is controlled to prevent condensation from forming on the cold ply 10 or elsewhere on the apparatus itself.

Figure 4:
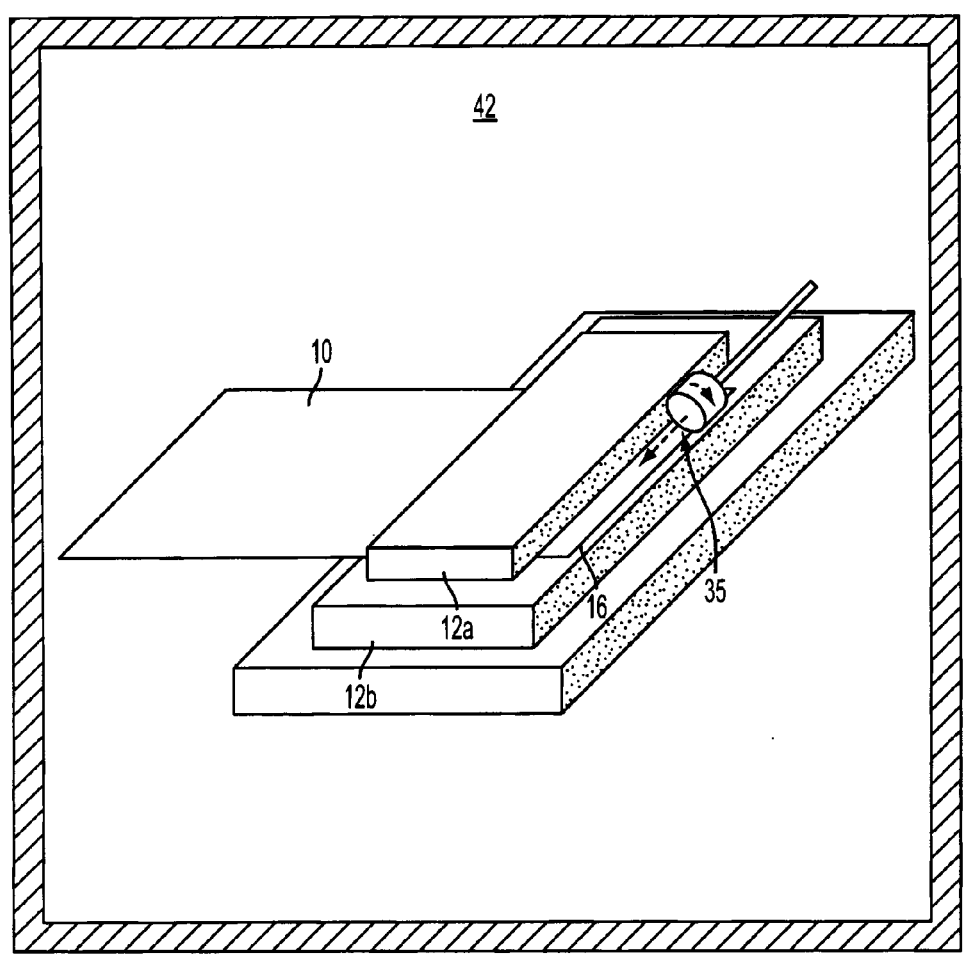
FIG. 4 shows the apparatus of FIG. 1 located within a climate-controlled environment.

Referring to FIG. 4, rather than applying refrigerant directly to the free edge 16 of the prepreg ply 10, the entire apparatus is located in a climate-controlled environment 42 that is sufficiently cold to maintain the epoxy below its uncured glass transition temperature during the chamfering process. Of course, it is also possible to apply refrigerant directly to the chamfering site 35 if necessary when the apparatus is located in a climate-controlled environment 42 such as this. In this example, refrigerant channels have been removed from the blocks 12a,12b, however it will be appreciated that such channels may be used in combination with a climate-controlled environment 42.

It will be appreciated that many modifications may be made to the techniques described above without departing from the scope of the present invention as defined by the accompanying claims. For example, it will be appreciated that the prepreg ply described by way of example above may be substituted for a semi-preg ply or other fibrous ply comprising a resinous matrix material. Also, whilst triax is described by way of example, it will be appreciated that the invention is not limited to the use of triax. Indeed, the fibres in the ply may have any other orientation, for example the fibres may all be unidirectional (ud). In addition, whilst a grinding wheel has been described above, it will be appreciated that the invention may be used in connection with any other machining tool or technique.

The invention claimed is:

1. A method of machining a fibrous sheet for a composite structure, the fibrous sheet comprising a resin matrix being tacky at room temperature and having a glass transition temperature, wherein the method comprises:
   providing the fibrous sheet at a first temperature;
   supporting the fibrous sheet for machining; and
   cooling at least part of the fibrous sheet to a second temperature below the first temperature, substantially to maintain a temperature of the matrix below its glass transition temperature during the machining.

2. The method of claim 1, comprising pre-cooling the fibrous sheet before the machining.

3. The method of claim 2, comprising pre-cooling a region of the fibrous sheet to be machined.

4. The method of claim 1, comprising cooling the fibrous sheet during the machining.

5. The method of claim 4, comprising cooling a region of the fibrous sheet being machined.

6. The method of claim 5, comprising applying a cooling fluid to the fibrous sheet at a location that moves to correspond with movement of the region of the fibrous sheet being machined.

7. The method of claim 1, wherein the supporting the fibrous sheet for machining includes supporting the fibrous sheet against one or more cooled surfaces before or during the machining.

8. The method of claim 7, wherein the one or more cooled surfaces are opposed cooled surfaces and the fibrous sheet is sandwiched between the opposed cooled surfaces.

9. The method of claim 7, comprising machining a region of the fibrous sheet extending beyond at least one of the one or more cooled surfaces.

10. The method of claim 7, comprising machining a region of the fibrous sheet supported by at least one of the one or more cooled surfaces.

11. The method of claim 1, comprising machining the fibrous sheet in a cooled environment.

12. The method of claim 1, comprising machining the fibrous sheet in a humidity-controlled environment.

13. The method of claim 1, comprising interrupting and restarting the machining while continuing cooling in the interim.

14. The method of claim 1, wherein the machining takes place in a climate-controlled environment that is sufficiently cold to maintain the resin in a brittle state during the machining process.

15. The method of claim 1, wherein a refrigerant is applied to the sheet to cool the resin such that the sheet becomes brittle.

16. The method of claim 15, wherein the refrigerant is applied locally to the fibrous sheet at a machining site where a machining tool contacts the fibrous sheet.

17. The method of claim 16, further comprising effecting relative movement between the machining tool and the fibrous sheet to vary the position of the machining site on the fibrous sheet, and moving the position at which refrigerant is applied to the fibrous sheet accordingly.

18. The method of claim 17, wherein a refrigerant supply moves in tandem with the machining tool.

19. The method of claim 16, wherein the machining tool has a grinding or cutting action.

20. The method of claim 1, comprising maintaining the temperature of the matrix at or below zero Celsius.

21. The method of claim 20, wherein the temperature of the matrix is maintained below −2 Celsius.

22. The method of claim 1, wherein the resin matrix is a thermoset resin and the temperature of the matrix is maintained below its uncured glass transition temperature.

23. The method of claim 1, wherein the machining effects tapering of an edge of the fibrous sheet.

24. A method of making a composite structure, comprising:
   tapering an edge of a fibrous sheet by a method of machining a fibrous sheet for a composite structure, the fibrous sheet comprising a resin matrix being tacky at room temperature and having a glass transition temperature, wherein the method comprises:
      providing the fibrous sheet at a first temperature;
      supporting the fibrous sheet for machining; and
      cooling at least part of the fibrous sheet to a second temperature below the first temperature, substantially to maintain a temperature of the matrix below its glass transition temperature during the machining, the machining effecting the tapering of the edge of the fibrous sheet; and
   incorporating the fibrous sheet into a composite structure with the tapered edge lying against or beside at least one other fibrous reinforcement sheet.

25. The method of claim 24, wherein the fibrous sheet and at least one of the at least one other fibrous reinforcement sheet each have a tapered edge and the tapered edges abut one another.

* * * * *